(12) United States Patent
Breyer et al.

(10) Patent No.: US 8,561,258 B2
(45) Date of Patent: Oct. 22, 2013

(54) HUBLESS CASTER TECHNOLOGY

(75) Inventors: Scott T. Breyer, Dousman, WI (US); Kyle C. Stoehr, Waukesha, WI (US)

(73) Assignee: Oconomowoc Mfg. Corp., Oconomowoc, WI (US)

( * ) Notice: Subject to any disclaimer, the term of this patent is extended or adjusted under 35 U.S.C. 154(b) by 430 days.

(21) Appl. No.: 12/793,957

(22) Filed: Jun. 4, 2010

(65) Prior Publication Data
US 2010/0306962 A1    Dec. 9, 2010

Related U.S. Application Data

(60) Provisional application No. 61/185,580, filed on Jun. 9, 2009.

(51) Int. Cl.
*A47B 91/00* (2006.01)
(52) U.S. Cl.
USPC .................................................. 16/46; 16/45
(58) Field of Classification Search
USPC ................ 16/45, 46, 18 R, 97, 98, 107, 35 R; 301/5.1
See application file for complete search history.

(56) References Cited

U.S. PATENT DOCUMENTS

| | | |
|---|---|---|
| 285,912 A | 10/1883 | Meehan |
| 978,161 A | 12/1910 | Holmes |
| 1,697,485 A | 1/1929 | Ware |
| 2,544,924 A | 3/1951 | Herold |
| 2,701,740 A | 2/1955 | Norman |
| 3,755,852 A | 9/1973 | Greene |
| 3,807,817 A | 4/1974 | Black |
| 3,834,006 A | 9/1974 | Greene |
| 3,997,938 A | 12/1976 | Pinaire et al. |
| 4,045,096 A | 8/1977 | Lidov |
| 4,054,335 A | 10/1977 | Timmer |
| 4,219,904 A | 9/1980 | Melara |
| 4,348,785 A | 9/1982 | Jordan |
| 4,465,321 A | 8/1984 | Berg |
| 4,544,425 A | 10/1985 | Provolo |
| 4,720,894 A | 1/1988 | Deasy et al. |
| 4,916,801 A | 4/1990 | Cooper |

(Continued)

FOREIGN PATENT DOCUMENTS

| | | |
|---|---|---|
| WO | WO2005118314 | 12/2005 |
| WO | WO2005119074 | 12/2005 |
| WO | WO2008034741 | 3/2008 |

OTHER PUBLICATIONS

The Best Designers of the Red Dot Award: Product Design 2006: Roland Kausemann, Frank Newey, Jorg Ostrenrieder and Marcus Wiedermann: www.en.red-dot.org/1851.htm [assessed on Apr. 29, 2009, 3 pages].

*Primary Examiner* — William Miller
(74) *Attorney, Agent, or Firm* — Fredrikson & Byron, PA

(57) ABSTRACT

Embodiments of the present invention provide a hubless caster that is at least as aesthetically pleasing as prior art hubless casters but that is significantly more durable. In one aspect, a hubless caster is provided that includes a frame member having two opposed sides. A generally ring-shaped mount portion projects from at least one of the two opposed sides of the frame member. In some embodiments, the hubless caster has the following three components mounted on the mount portion, in sequence moving radially outwardly from the mount portion: a) an annular backbone member defining an inner bearing race, b) a rolling element, and c) a wheel defining an outer bearing race.

26 Claims, 17 Drawing Sheets

(56) References Cited

U.S. PATENT DOCUMENTS

| | | |
|---|---|---|
| 5,068,943 A | 12/1991 | Estkowski et al. |
| 5,078,221 A | 1/1992 | Rewitzer |
| 5,119,525 A | 6/1992 | Melara |
| 5,226,739 A | 7/1993 | Estkowski et al. |
| 5,230,571 A | 7/1993 | Estkowski et al. |
| 5,248,019 A | 9/1993 | Sbarro |
| 5,263,238 A | 11/1993 | Cooper |
| 5,303,449 A | 4/1994 | Gray |
| 5,419,619 A | 5/1995 | Lew |
| 5,490,719 A | 2/1996 | Lew |
| 5,493,755 A | 2/1996 | Kindstrand et al. |
| 5,568,671 A | 10/1996 | Harris et al. |
| 6,336,685 B1 | 1/2002 | Orr |
| 6,748,623 B1 | 6/2004 | Tsai |
| 6,839,939 B2 | 1/2005 | Donakowski |
| 7,150,070 B2 | 12/2006 | Donakowski |
| 7,207,084 B2 | 4/2007 | Melara |
| 7,647,673 B2 * | 1/2010 | Melara .......................... 16/35 R |
| 7,657,969 B2 * | 2/2010 | Trivini .............................. 16/45 |
| 2005/0081329 A1 | 4/2005 | Tsai |
| 2007/0143958 A1 | 6/2007 | Trivini |
| 2007/0186373 A1 | 8/2007 | Melara |
| 2008/0163455 A1 | 7/2008 | Tsai |
| 2009/0193621 A1 * | 8/2009 | Melara .......................... 16/35 R |
| 2010/0306962 A1 * | 12/2010 | Breyer et al. ..................... 16/46 |
| 2011/0203074 A1 * | 8/2011 | Trivini .............................. 16/45 |

* cited by examiner

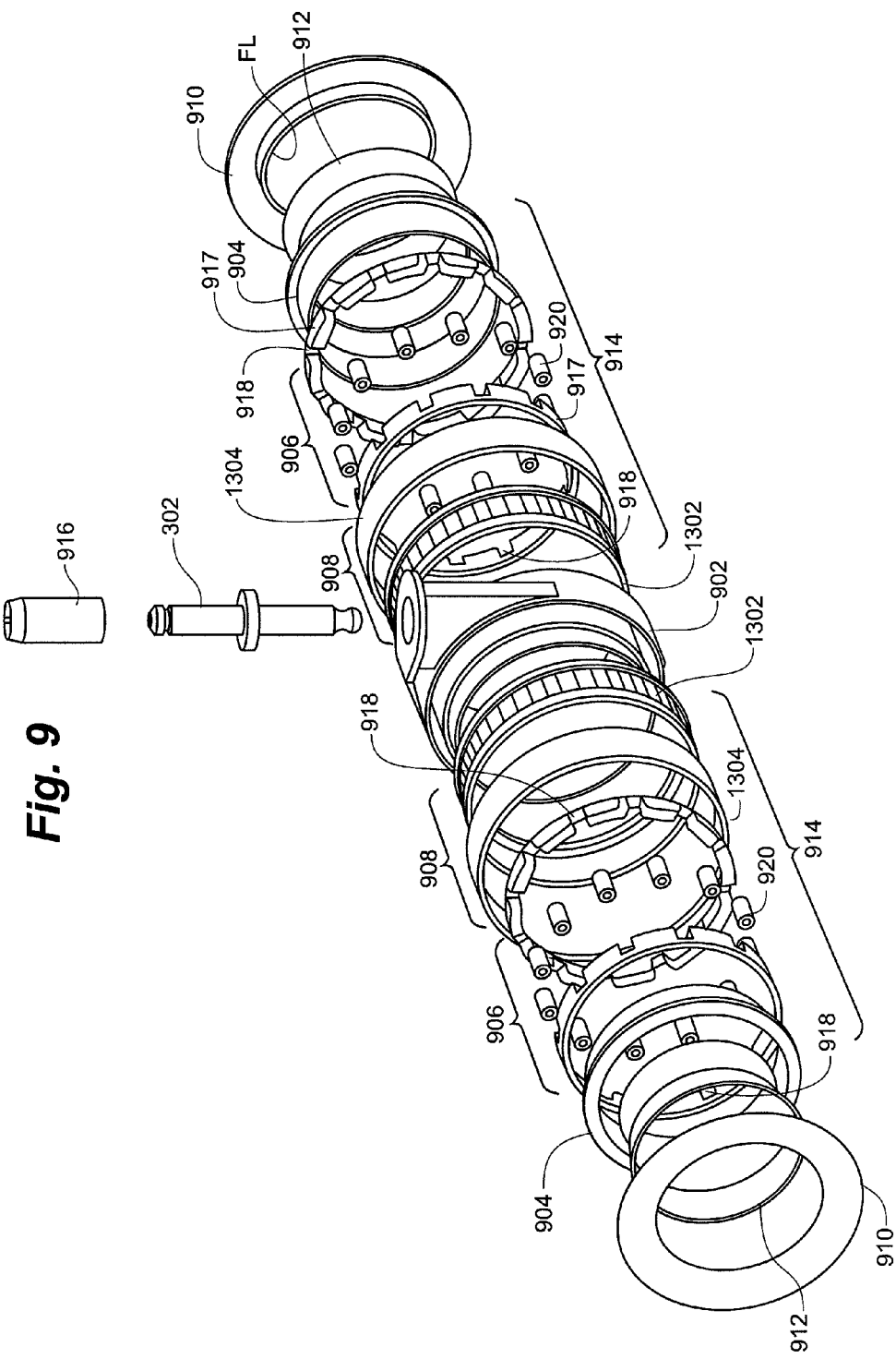

*Fig. 13E* *Fig. 13F* 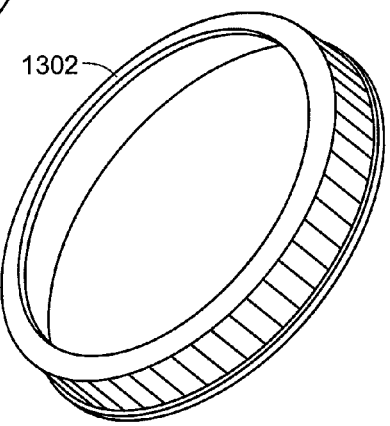

HUBLESS CASTER TECHNOLOGY

CROSS-REFERENCE TO RELATED APPLICATION

The present application claims priority to U.S. application Ser. No. 61/185,580, filed Jun. 9, 2009, the entire disclosure of which is incorporated herein by reference.

BACKGROUND

Caster assemblies are well known. They are provided on a wide variety of articles that are moveable by rolling, including chairs and other furniture (tables, sofas, beds, etc.), stands for medical equipment and other instrumentation, cabinets, work surfaces, dollies, and the like. FIG. 1 shows one type of conventional caster assembly 10. Here, the caster assembly 10 includes a wheel 12 that is rotationally coupled to a caster frame 14. The caster frame 14 is coupled to a caster stem 16, which allows the caster assembly 10 to be attached to an article (not shown in FIG. 1) such that the wheel 12 is free to pivot relative to the article.

FIG. 2 shows an exploded view of a prior art caster assembly 200 that has no central hub. Such caster assemblies are known as hubless casters. Hubless casters typically provide a more aesthetically pleasing appearance, as compared to conventional hubbed casters. However, due to various design limitations, previous hubless casters have not delivered the performance necessary for widespread adoption.

One key performance deficiency of prior art hubless casters is durability. Certain prior art designs would simply wear out too quickly. One reason for this lack of durability relates to how the frame member 202 of such hubless casters 200 interfaces with the rolling element 204. The rolling element 204 shown in FIG. 2, for example, is mounted directly on a mount portion 206 of the frame member 202. In other words, the mount portion of the frame member itself defines the inner bearing race. As a consequence, when the caster rolls, rollers 208 (or ball bearings) of the rolling element 204 bear directly against the mount portion 206. Over time, this can cause the mount portion 206 to wear prematurely (note that in a design of this nature, the inner race defined by the mount portion is a primary wear component). As a result, the longevity and overall performance of the hubless caster can be diminished significantly.

Certain other prior art hubless casters lack durability, or do not perform as well as they could, due to a narrow distribution of load across the width of the mount portion 206. The width of an exemplary mount portion 206 is shown as W in FIG. 2. Some prior art hubless casters concentrate the load exerted on the mount portion in a narrow region of the mount portion. For example, a row of relatively small ball bearings may be provided, and these ball bearings may only contact a small width of the mount portion. The resulting highly concentrated load can accelerate wear on the mount portion, and this can impair the longevity and overall performance of such hubless casters.

SUMMARY

Certain embodiments of the present invention provide a hubless caster that is at least as aesthetically pleasing as prior art hubless casters but is significantly more durable. Some embodiments provide a durable separate sleeve (or "annular backbone member") that defines an inner bearing race and protects the mount portion of the central frame member, thereby preventing premature wear of the mount portion. In many instances, providing this backbone member in combination with a rolling element and an outer wheel provides enhanced durability for the hubless caster. Additionally, some embodiments are configured to provide a well distributed (e.g., width-wise) force transfer from the wheel, through the rolling element, then through the backbone member, and to the mount portion of the frame member.

In some embodiments, the invention provides a hubless caster comprising a frame member with two opposed sides from at least one of which projects a generally ring-shaped mount portion. In the present embodiments, the hubless caster includes the following three components mounted on the mount portion, in sequence moving radially outwardly from the mount portion: a) an annular backbone member defining an inner bearing race, b) a rolling element, and c) a wheel defining an outer bearing race.

Some embodiments of the invention provide a durable low profile hubless caster. Here, the caster has a hubless roller assembly with an outer wheel radius and a radial thickness. In the present embodiments, the radial thickness of the hubless roller assembly is less than half as great as the outer wheel radius, such that the hubless caster has a profile ratio of less than 0.5 and yet the hubless caster has a dynamic load rating of at least 150 pounds.

In certain embodiments, the invention provides a hubless caster comprising a frame member having two opposed sides from at least one of which projects a generally ring-shaped mount portion. In the present embodiments, the hubless caster has the following three components mounted on the mount portion, in sequence moving radially outwardly from the mount portion: a) an annular backbone member defining an inner bearing race, b) a rolling element, and c) a wheel defining an outer bearing race. In the present embodiments, the hubless caster is provided with a roller-retention end cap, and the end cap is joined to the mount portion so as to retain the annular backbone member, rolling element, and wheel on the frame member.

Some embodiments of the invention provide a hubless caster having a low friction ring that defines a wheel. In the present embodiments, the low friction ring is adapted to slide in a channel of the caster, and the caster is devoid of ball bearings and roller bearings.

BRIEF DESCRIPTION OF THE DRAWINGS

The following drawings are illustrative of particular embodiments of the present invention and therefore do not limit the scope of the invention. The drawings are not necessarily to scale and are intended for use in conjunction with the explanations in the following detailed description. Embodiments of the present invention will hereinafter be described in conjunction with the appended drawings, wherein like numerals denote like elements.

FIG. 9 is an exploded view of the hubless caster of FIG. 3.

FIG. 13E is a perspective view of the exterior ring of FIG. 13D; and FIG. 13F is a perspective view of a bearing interface ring of the wheel of FIG. 13A.

DETAILED DESCRIPTION OF PREFERRED EMBODIMENTS

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the examples provided have suitable alternatives that can be used.

Figure 3:
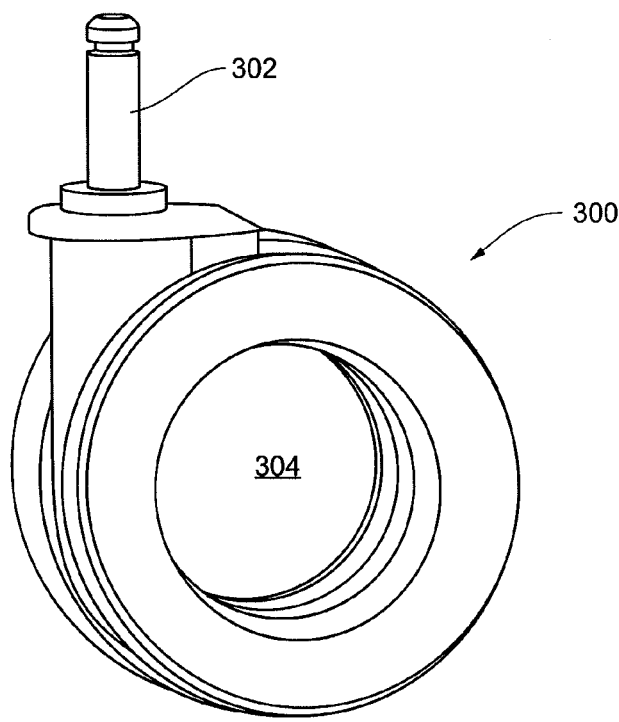
FIG. 3 is a perspective view of a hubless caster according to an embodiment of the present invention.
Figure 4:
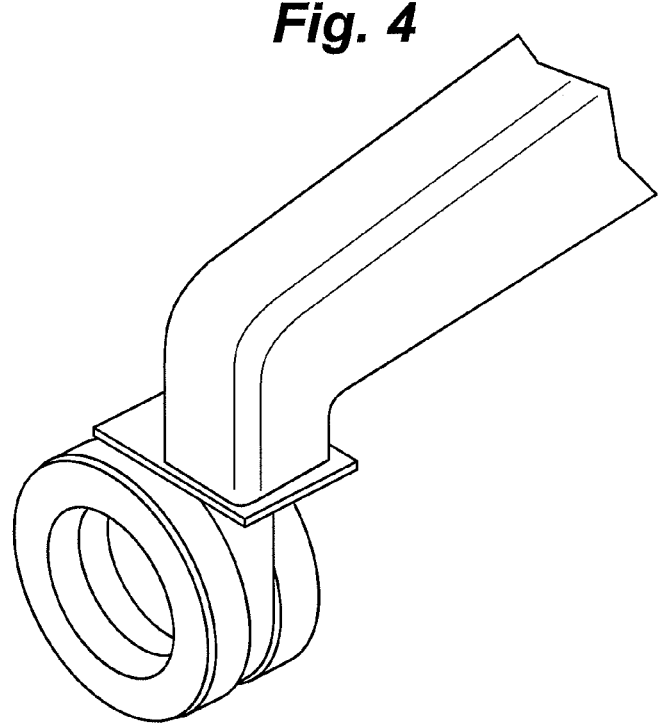
FIG. 4 is a perspective view of the hubless caster of FIG. 3 in connection with the leg of a chair or other structure.
Figure 5:
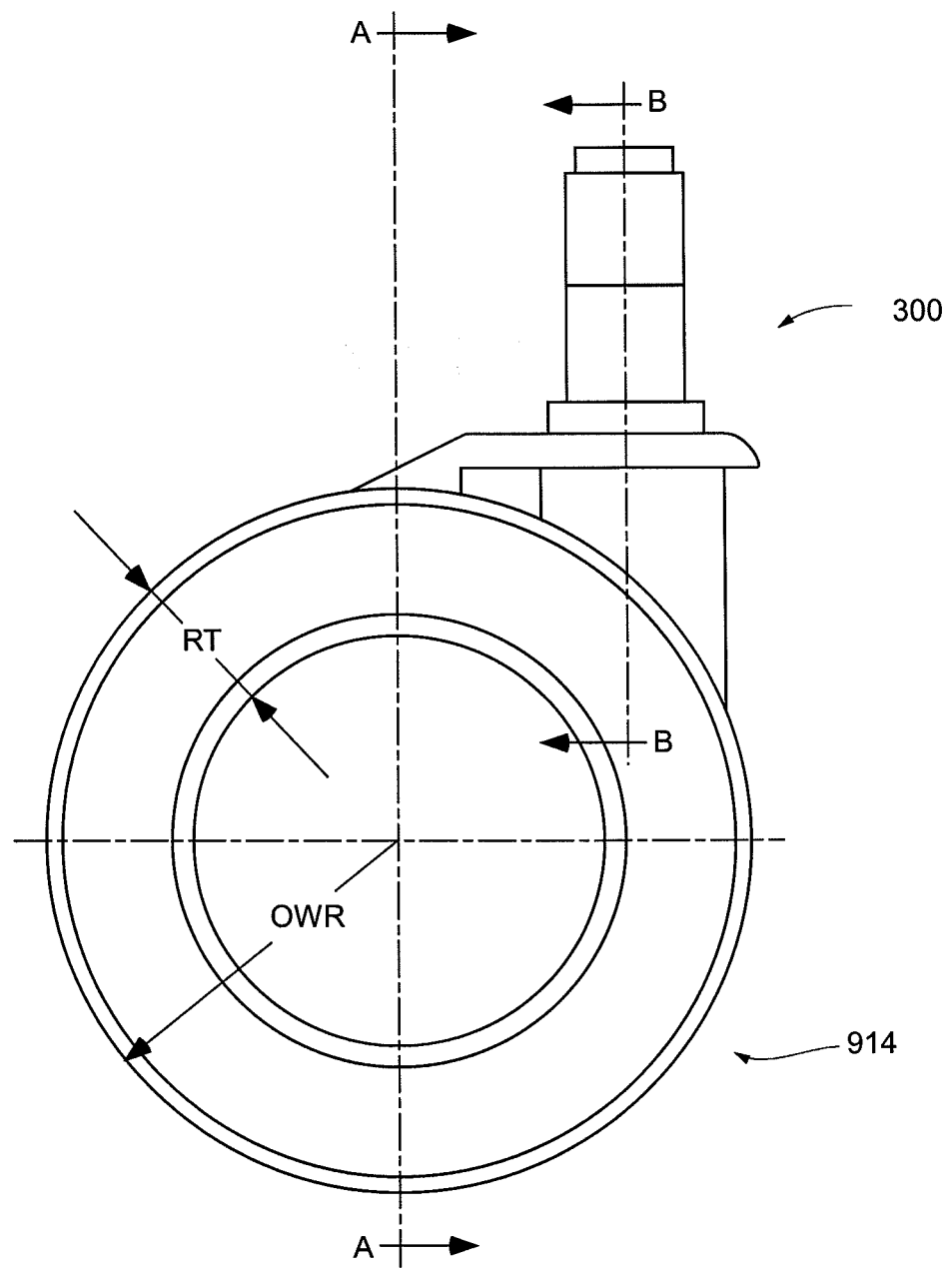
FIG. 5 is a side view of the hubless caster of FIG. 3.
Figure 6:
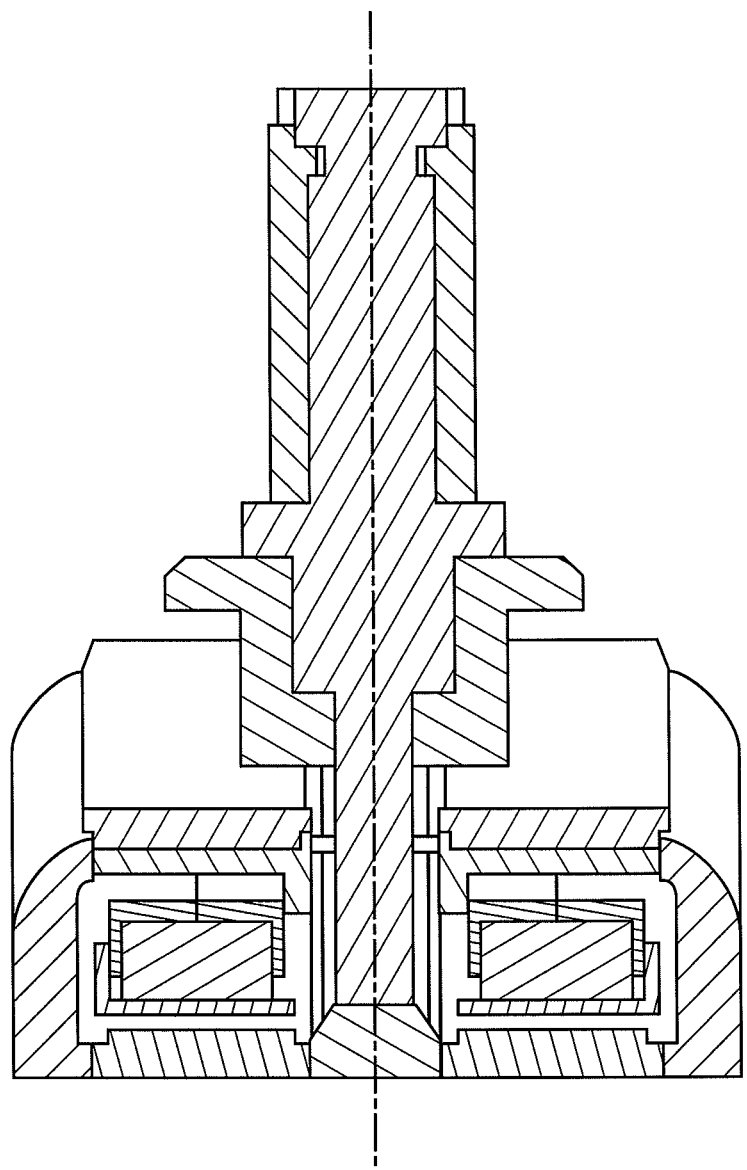
FIG. 6 is a cross-sectional view of section B-B (see FIG. 5) of the hubless caster of FIG. 3.
Figure 7:
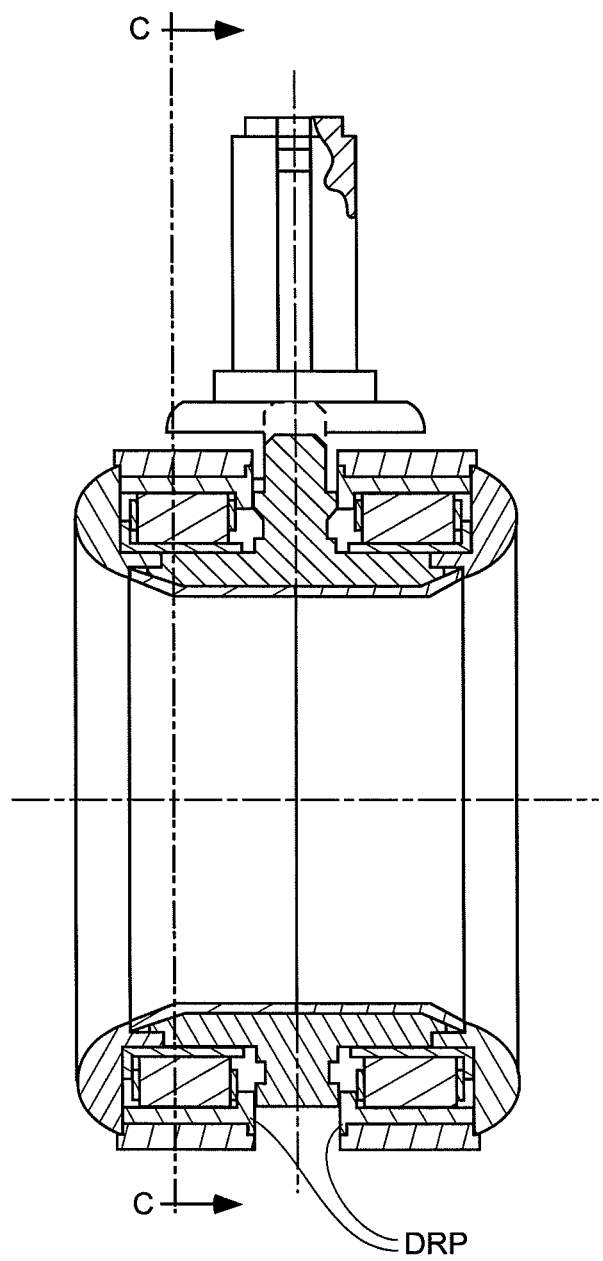
FIG. 7 is a cross-sectional view of section A-A (see FIG. 5) of the hubless caster of FIG. 3.
Figure 8:
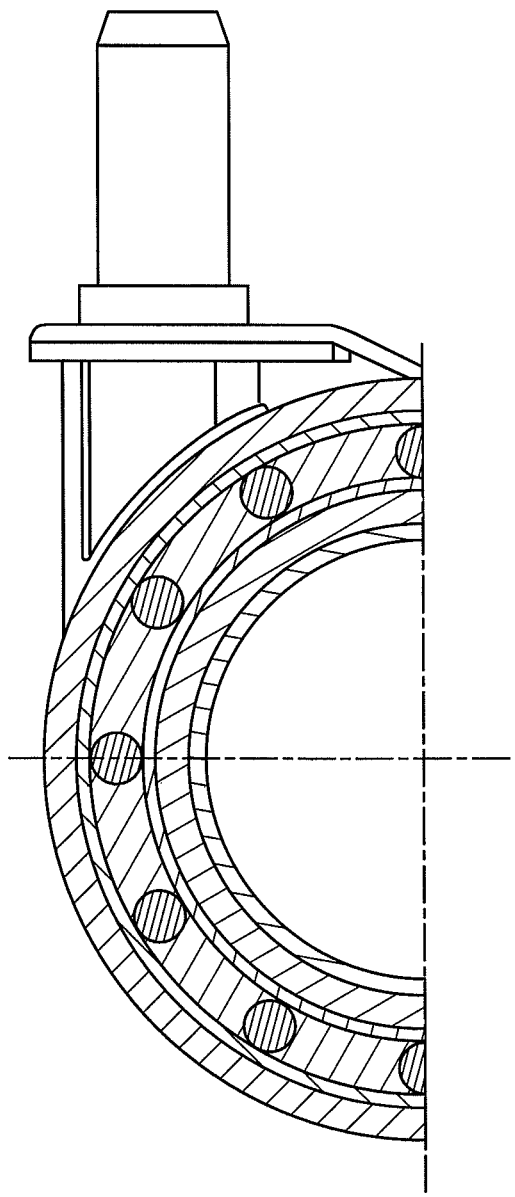
FIG. 8 is a cross-sectional view of section C-C (see FIG. 7) of the hubless caster of FIG. 3.
Figure 10A:
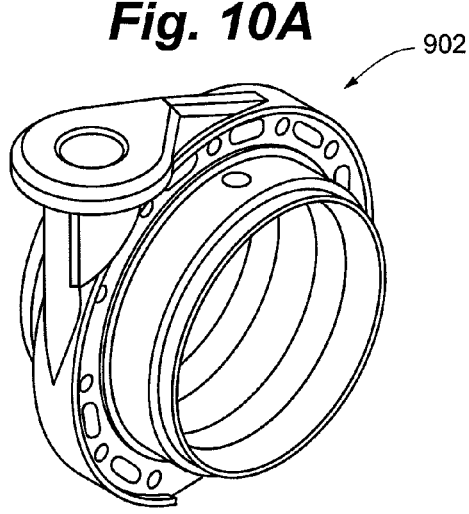
FIG. 10A is a perspective view of a central frame member according to an embodiment of the present invention.
Figure 10B:
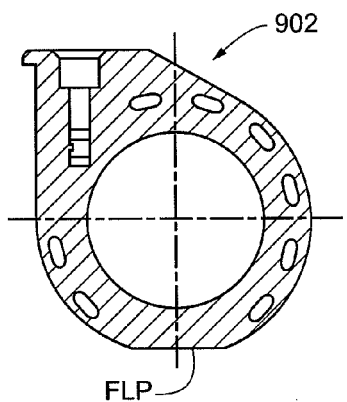
FIG. 10B is a cross-sectional view of the central frame member of FIG. 10A.
Figure 10C:
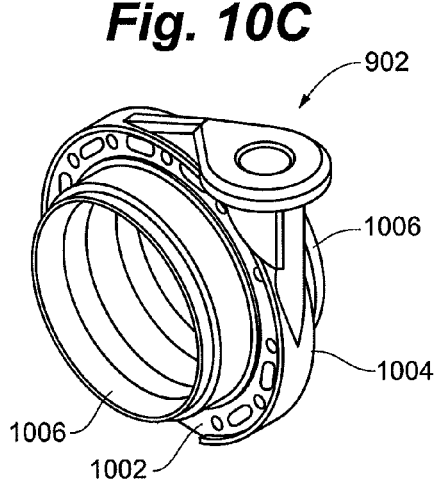
FIG. 10C is another perspective view of the central frame member of FIG. 10A.
Figure 10D:
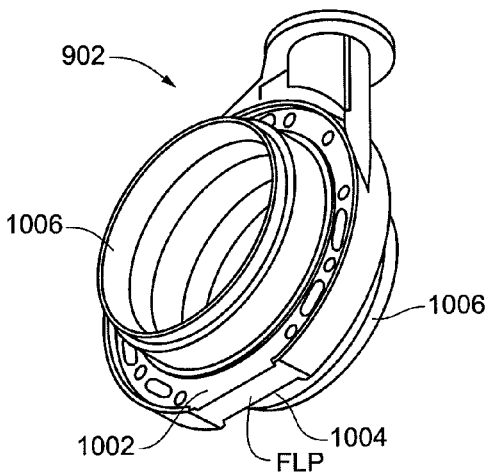
FIG. 10D is yet another perspective view of the central frame member of FIG. 10A.

FIGS. 3-4 show perspective views of a hubless caster 300 according to certain embodiments of the present invention. As shown, the hubless caster 300 includes (or defines) a central opening 304, where the hub would be located on a conventional hubbed caster. The illustrated central opening 304 is generally cylindrical, having a longitudinal axis that is generally parallel to the surface on which the hubless caster 300 is configured to roll. Thus, on the longitudinal axis of the caster 300, there is no caster material (instead, there is just an open space). FIG. 3 shows the hubless caster 300 with a caster stem 302, and FIG. 4 shows the hubless caster 300 mounted to the leg of a chair or other article. FIG. 5 shows a side view of the hubless caster 300, FIGS. 6-7 are cross-sectional views referenced in FIG. 5, and FIG. 8 is a cross-sectional view referenced in FIG. 7. While the illustrated central opening 304 is round, other configurations can be used (e.g., the opening can alternatively be square, or it can take the shape of some other polygon).

Figure 18:
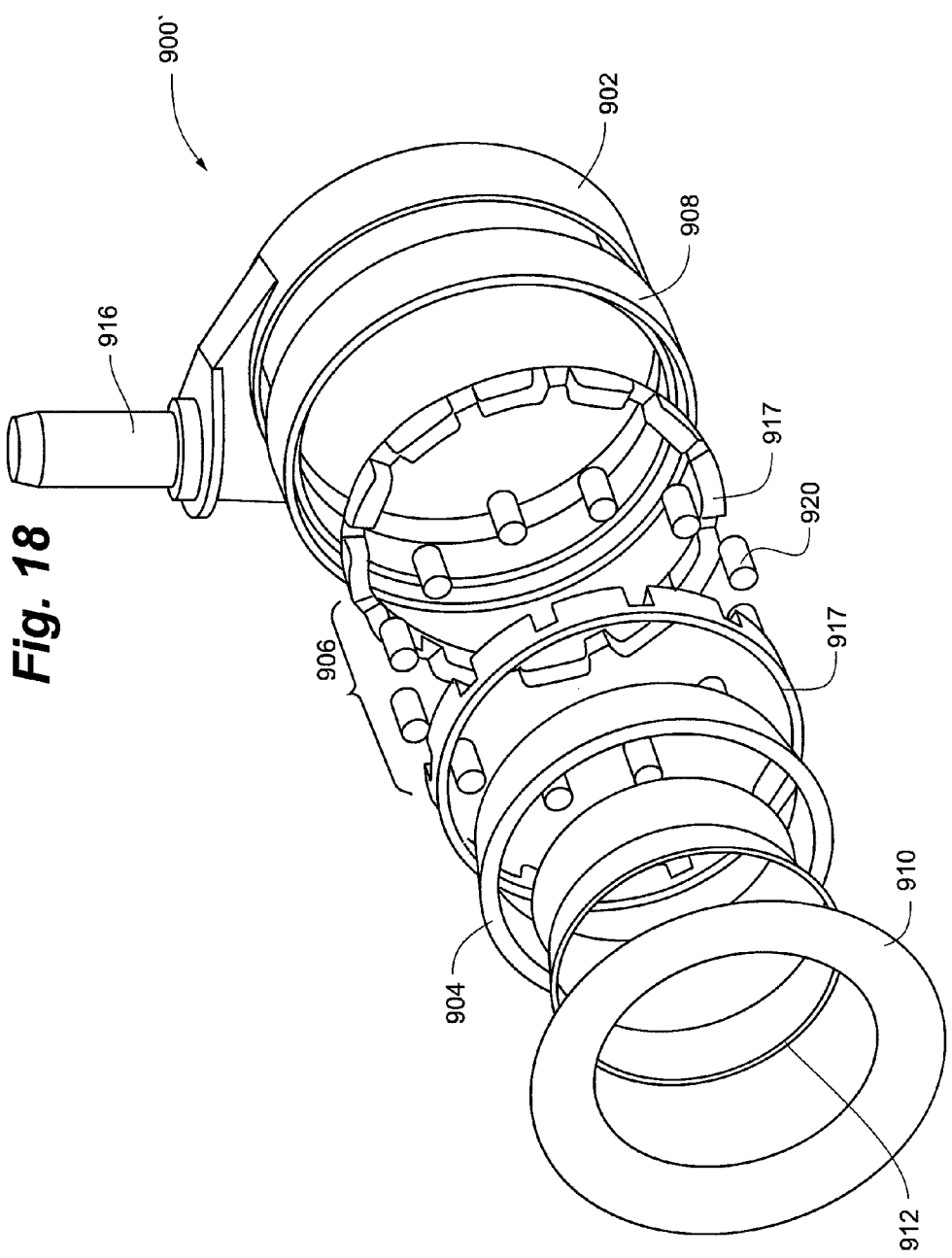
FIG. 18 is an exploded view of a hubless caster having a single-wheel design in accordance with certain embodiments of the invention.

FIG. 9 shows an exploded view of one hubless caster 300 embodiment, which includes a caster stem 302 and a friction sleeve 916. The caster stem can alternatively be integral to the caster frame, although this will commonly be less preferred. Also, the friction sleeve can be replaced with a conventional metal friction ring. The illustrated hubless caster 300 includes a frame member 902 and two hubless roller assemblies 914, along with corresponding liner rings 912 and end caps 910. The liner rings here are decorative and can be omitted, if so desired. While the hubless caster 300 shown in FIG. 9 has a twin-wheel design, the present caster can alternatively have a single-wheel design, as exemplified in FIG. 18.

FIGS. 10A-10D show various views of an exemplary frame member 902. Generally, the frame member 902 will include two opposed sides 1002, 1004. A mount portion 1006 (which is generally ring shaped in the illustrated embodiments) projects from one of the two opposed sides 1002, 1004. Hubless caster embodiments having two wheels generally include a central frame member with two such mount portions. In such embodiments, two mount portions project respectively from the two opposed sides 1002, 1004 of the frame member. Hubless caster embodiments having only one wheel (see FIG. 18) generally include a frame member with only one such mount portion. In some embodiments, the frame member 902 and the mount portion(s) 1006 projecting therefrom are defined by a single body. For example, the frame member 902 and the mount portion(s) 1006 can be injection molded using a polymer with a relatively high degree of hardness (as just one example, an acetal resin with 20-30% glass filler can be used). In other embodiments, the frame member 902 and the mount portion(s) 1006 are formed by a single metal body machined, cast, or formed from a suitable metal (e.g., powdered steel). Such embodiments can be useful for heavier-duty applications. In still other embodiments, the frame member 902 and the mount portion(s) 1006 can be separate components coupled together to collectively form the frame member.

Referring again to FIG. 9, each roller assembly 914 of the illustrated hubless caster 300 includes an annular backbone member 904, a rolling element 906, and a wheel 908. These components are described in detail in the following paragraphs.

Figure 11:
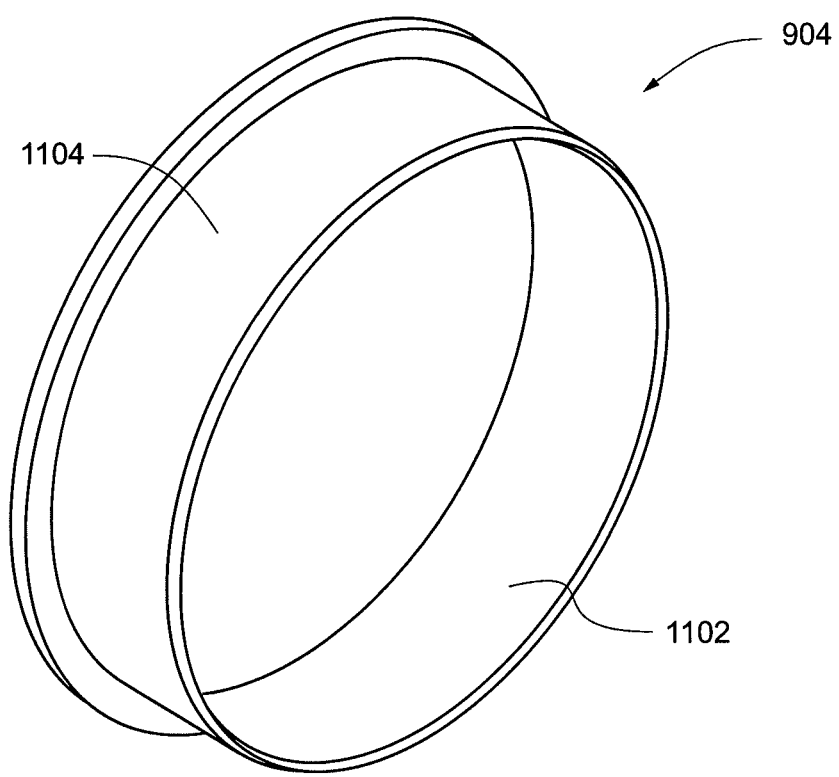
FIG. 11 is a perspective view of an annular backbone member according to an embodiment of the present invention.

The annular backbone member 904 of FIG. 9 is shown in FIG. 11. The backbone member 904 can be sized such that its inner surface 1102 contacts the outer surface of the corresponding mount portion when the backbone member is mounted on the mount portion. In preferred embodiments, the backbone member 904 is formed of a different material than the mount portion. For example, when the mount portion comprises (or consists essentially of) a polymer, the backbone member 904 preferably comprises (or consists essentially of) a metal. In certain preferred embodiments, the backbone member 904 comprises a steel ring. The backbone member can be a metal ring made, for example, by stamping, or it can be machined, cast, or formed from a suitable metal (e.g., powdered steel).

Figure 12:
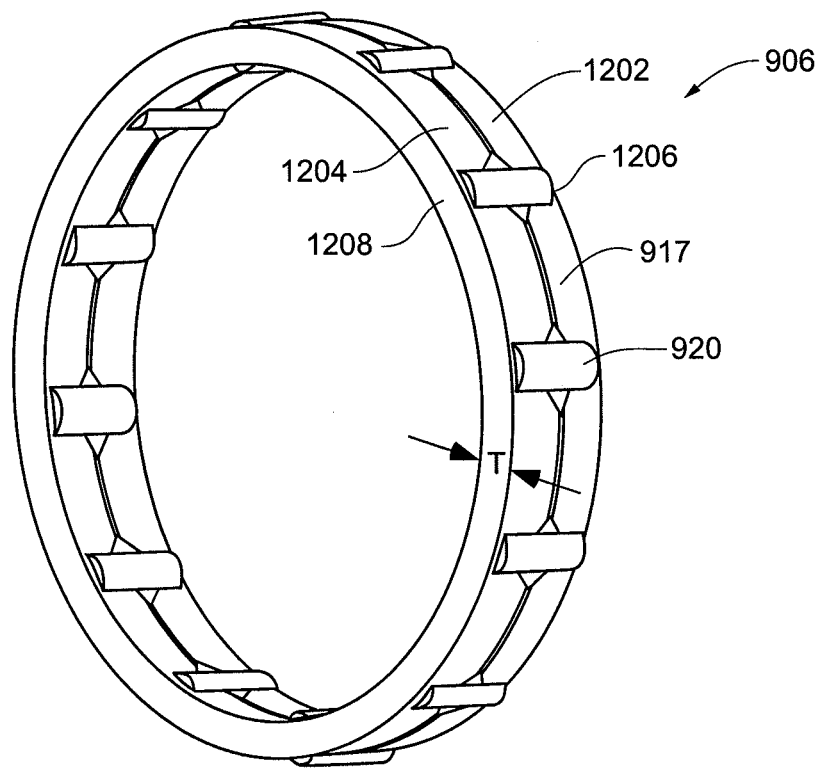
FIG. 12 is a perspective view of a rolling element according to an embodiment of the present invention.

The rolling element 906 of FIG. 9 is shown in FIG. 12. Referring to both FIGS. 9 and 12, the illustrated rolling element 906 includes a retainer 917 having receptacles 918 into which rollers (optionally having a cylindrical shape) 920 can be inserted. The diameter of the rollers 920 preferably is slightly larger than the thickness T of the retainer 917. When tangential force is applied to the rollers 920, the rollers 920 rotate within the receptacles 918. As the rollers 920 rotate, the degree of friction between the rollers 920 and the receptacles 918 preferably is low. As described below in greater detail, the rotating rollers 920 roll against both the backbone member 904 and the wheel 908 to provide the rolling functionality of the hubless caster 300. The retainer can be, for example, molded. When the rollers are metal (e.g., steel), they can be cold headed or machined. When the rollers are plastic, they can be molded. Other manufacturing methods can be used as well.

The retainer 917 of the rolling element 906 can be provided in a variety of configurations. As shown in FIGS. 9 and 12, the retainer 917 can include two pieces 1202, 1204 (e.g., two halves). To assemble a rolling element 906 having a two-piece retainer 917, the rollers 920 are inserted into the roller receptacles 918 of one of the retainer pieces 1202, 1204, and then the roller receptacles 918 of the other retainer piece 1202, 1204 are aligned and positioned such that the rollers 920 are inserted into the receptacles 918 of both retainer pieces 1202, 1204. The side edges 1206, 1208 of the retainer pieces 1202, 1204 prevent the rollers from escaping the roller receptacles 918. The two-part retainer is advantageous in terms of noise reduction. It is also advantageous in that the space in the center of the retainer can accommodate fluctuations in the roller length, e.g., the roller element will not be pinched. Further, the two part design of the illustrated retainer can make assembly automation easier.

Thus, one group of embodiments provides a hubless caster that includes at least one rolling element comprising such a two-part retainer. In these embodiments, the hubless caster can be of any design shown or described herein. However, the two-part retainer can also be used in a hubless caster of any other known design. Thus, the present embodiment group extends to any hubless caster having a two-part retainer of the nature described herein.

Figure 1:
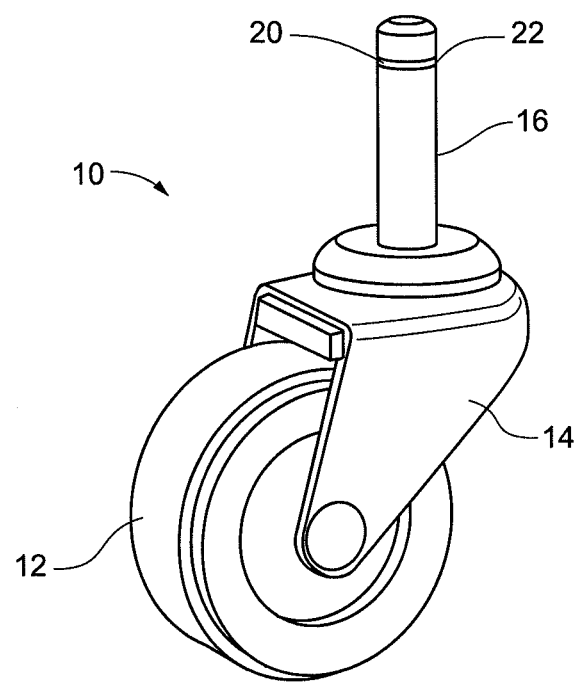
FIG. 1 is a perspective view of a prior art caster assembly.
Figure 2:
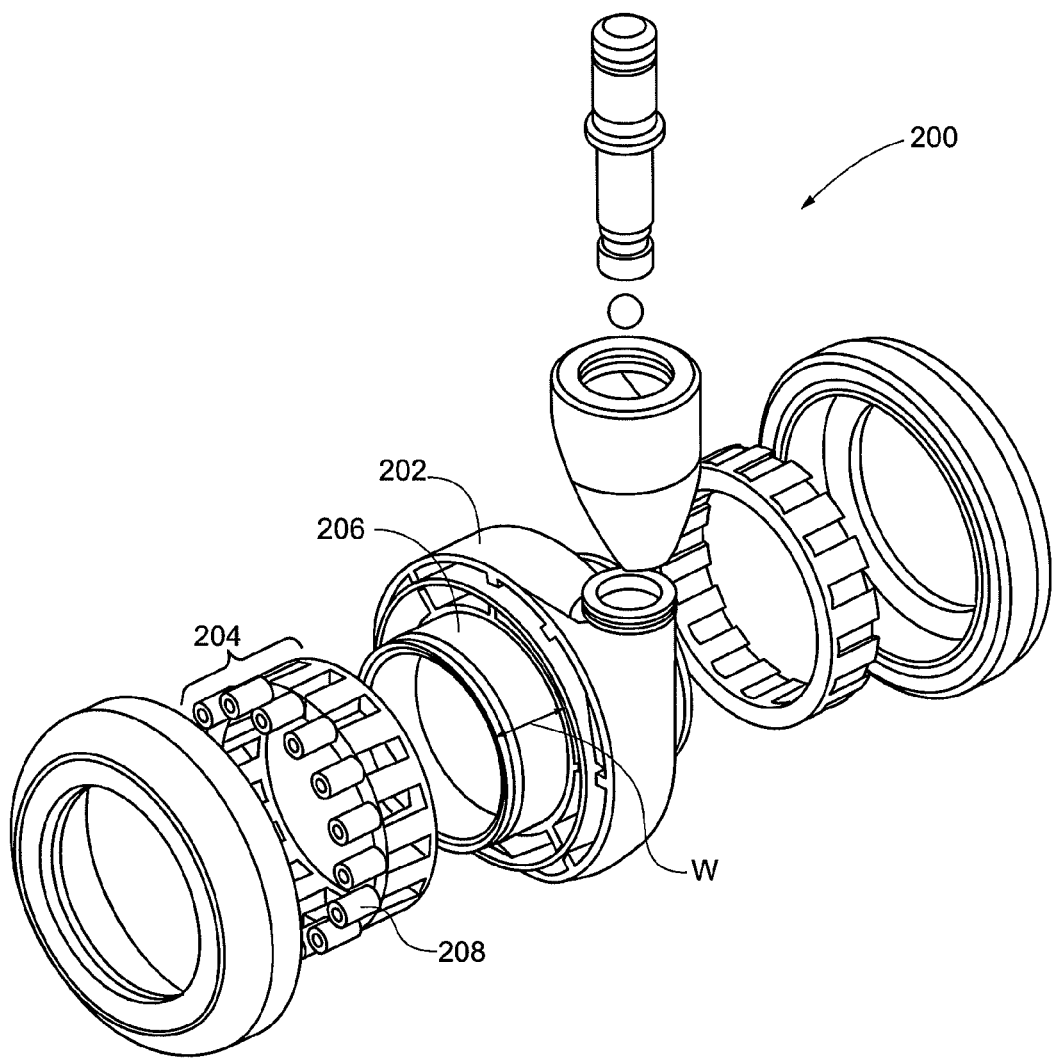
FIG. 2 is a is an exploded view of a prior art hubless caster assembly.

In other embodiments, the retainer 917 can be a single piece. One-piece retainers can have a single side edge, with the other side being open for receiving the rollers into the receptacles (e.g., as shown in FIG. 2). Other retainer configurations can be used as well.

Figure 13A:
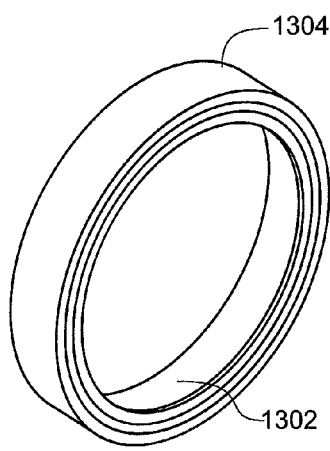
FIG. 13A is a perspective view of a wheel according to an embodiment of the present invention.
Figure 13B:
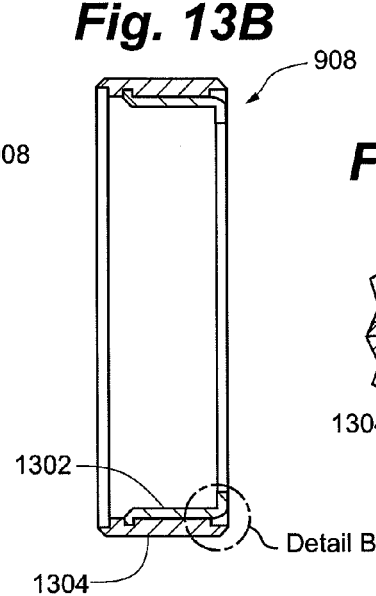
FIG. 13B is a cross-sectional view of the wheel of FIG. 13A.
Figure 13C:
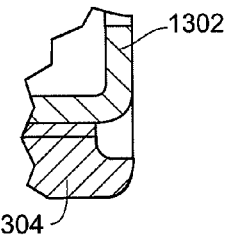
FIG. 13C is a detail view of region B (see FIG. 13B) of the wheel of FIG. 13A.
Figure 13D:
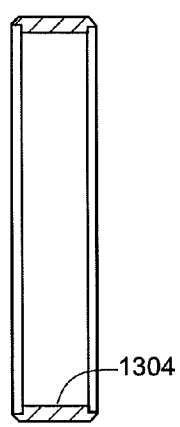
FIG. 13D is a cross-sectional view of an exterior ring of the wheel of FIG. 13A.

An exemplary wheel 908 is shown in FIGS. 13A-13F. Here, the illustrated wheel 908 has an advantageous two-piece construction. Specifically, the wheel 908 includes a bearing interface ring (or "inner ring") 1302 and an exterior ring (or "outer ring") 1304. The illustrated bearing interface ring 1302 fits within the exterior ring 1304, and the two components are joined together. These two pieces can be joined together in a variety of ways (such that the bearing interface ring 1302 and the exterior ring 1304 are prevented from rotating relative to each other). In some embodiments, the exterior ring comprises (or consists essentially of) a polymer, optionally containing a filler, while the bearing interface ring comprises (or consists essentially of) a metal. As just one example, the exterior ring can be formed of acetal with about 20-30% glass fill, while the bearing interface ring is formed of steel. In these and other embodiments, the two components can be joined together via mechanical bonding. FIGS. 13A-13F depict one depict one useful form of mechanical bonding. Here, the bearing interface ring 1302 is formed of metal (e.g., steel), and the exterior ring (or "tire") 1304 comprises a polymer. The inner ring 1302 can be made by stamping, and the exterior ring 1304 can be formed onto the inner ring 1302 by insert molding. The illustrated bearing interface ring 1302 has knurling on its outer surface (see FIG. 13F), and its flange has openings, such as holes or slots. Thus, when a polymer outer ring is insert molded onto the inner ring 1302, the polymer flows into interlocking engagement with the knurling and the openings. Also, as shown in FIG. 13B, the inner ring 1302 can have a flange that rises into the outer ring. This combination of features is desirable in that it provides a two-part wheel assembly in which the outer ring 1304 is highly resistant to becoming separated from the inner ring 1302. In the bonding example just described, only mechanical bonding is used. If desired, though, a chemical bond can be used. It is to be understood that the noted bonding features are merely exemplary.

In other embodiments, the wheel can be a single ring (optionally comprising a polymer) that interfaces with both the rolling element and the surface (e.g., the ground) on which the hubless caster is configured to roll.

Referring to FIGS. 9 and 10A-10D, when the hubless caster 300 is assembled, multiple components are mounted on the mount portion(s) 1006 of the frame member 902. In some embodiments, an annular backbone member 904, a rolling element 906, and a wheel 908 are all mounted on each mount portion 1006 of the frame member 902. In the illustrated embodiments, when the backbone member 904 is mounted on the mount portion 1006, the backbone member 904 is carried against, but is not joined to (e.g., is not bonded to), the mount portion 1006. In some embodiments of this nature, the backbone member is free to rotate relative to the mount portion. In some cases, the annular backbone member 904 comprises a metal, and the mount portion 1006 comprises a polymer.

Thus, three components preferably are mounted on the mount portion 1006 in the following sequence, moving radially outward from the mount portion: the annular backbone member 904, the rolling element 906, and the wheel 908. In such embodiments, the backbone member 904 is located radially between the mount portion 1006 and the rolling element 906, and the rolling element 906 is located radially between the backbone member 904 and the wheel 908.

Figure 15:
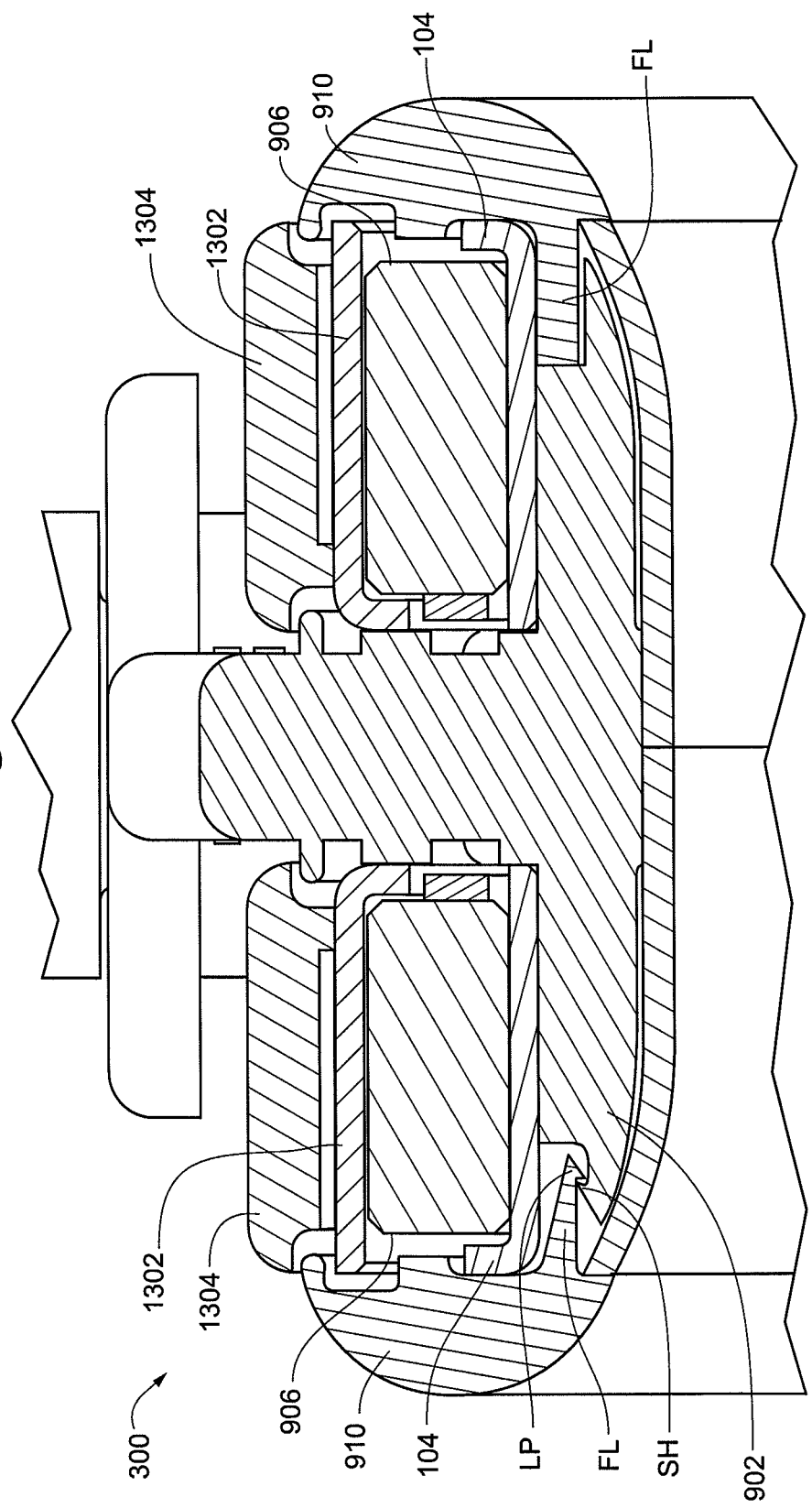
FIG. 15 is a cross-sectional view of an end cap snap-fitted onto a mount portion of a caster frame according to certain embodiments of the present invention.
Figure 16:
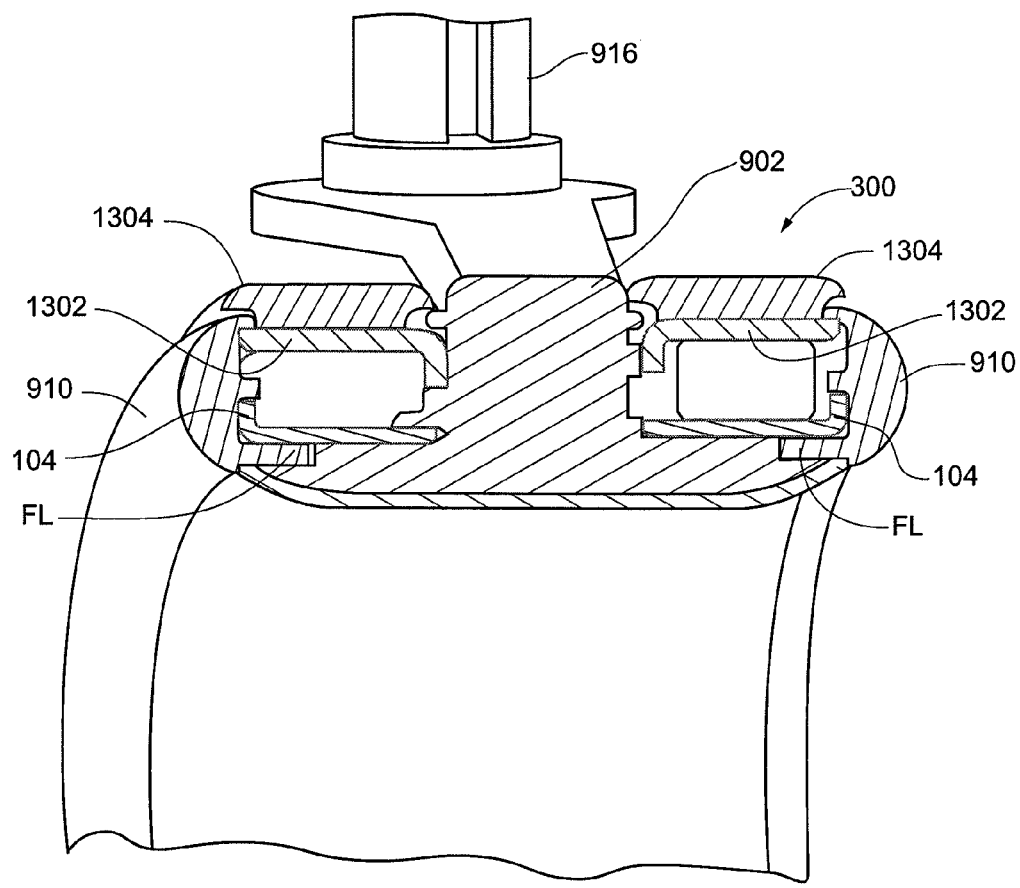
FIG. 16 is a cutaway view of a hubless caster according to some embodiments of the present invention wherein an end cap is ultrasonically welded to a mount portion of a caster frame.

In some embodiments, the hubless caster 300 is provided with an end cap 910 for each mount portion 1006. One exemplary end cap design is shown in FIG. 9. Here, each end cap 910 is configured to be joined to a corresponding mount portion 1006 of the frame member 902, e.g., so as to retain each annular backbone member 904, rolling element 906, and wheel 908 on the frame member. Each end cap 910 optionally remains in a non-rotating configuration even when the corresponding wheel 908 of the hubless caster 300 is rotating. In such embodiments, the wheel 908 can rotate relative to both the end cap 910 and the frame member 902. In some embodiments, the mount portion(s) 1006 and the end cap(s) 910 each comprise a polymer, and an ultrasonic weld joins the end cap(s) 910 to the corresponding mount portion(s) 1006. FIG. 16 shows one such embodiment wherein flanges of polymer end caps 910 are in contact with polymer mount portions 1006, such that the illustrated caster 300 can be placed in an ultrasonic environment to join these parts (e.g., by providing an ultrasonic weld) where they are in polymer-to-polymer contact with one another. In other embodiments, the end cap(s) 910 are snap-fitted onto the corresponding mount portion(s) 1006. FIG. 15 shows one such embodiment wherein at least one detent LP of the end cap cooperates with a detent SH of the corresponding mount portion so as to snap-fit the end cap onto the mount portion. Here, the end cap 910 seen on the left in FIG. 15 has a flange FL that defines a lip LP adapted to snap-fit onto the corresponding mount portion when the lip LP engages a shoulder SH of the mount portion. Many other snap-fit options will be apparent to skilled artisans given the present teaching as a guide. In some embodiments where an end cap is snap-fitted onto a corresponding mount portion, the snap-fit is irreversible, such that the only way to remove the end cap 910 is to break an end cap detent, a mount portion detent, or both. As another alternative, the end cap can be joined adhesively to the mount portion. As still another alternative, there can be a threaded connection of an end cap and the corresponding mount portion.

Referring again to FIG. 9, the hubless caster can optionally have a labyrinth seal. When provided, the labyrinth seal creates a torturous path for dirt, liquid, and other contaminants to travel before they can reach and interfere with the rolling element. Thus, one group of embodiments provides a hubless caster having a labyrinth seal. In this group of embodiments, the hubless caster can have any configuration shown or described herein. However, the present embodiment group extends to any other hubless caster design that is provided with a labyrinth seal.

The illustrated hubless caster is provided with an optional flat bottom portion FLP (see FIGS. 10B and 10D) adjacent to which there is at least one drainage port from which fluid or other contaminants can escape from the caster (e.g., due to gravity forcing the fluid downwardly toward, and out of, the drainage port). In the illustrated design, each roller assembly 914 is provided with its own drainage port DRP (see FIG. 7). Thus, one group of embodiments provides a hubless caster comprising a frame member (e.g., a central frame member) having a bottom portion provided with (or adjacent to which there is) at least one drainage port configured to allow liquid inside the caster to escape from the caster. In this embodiment group, the hubless caster can have any configuration shown or described herein. However, the present embodiments extend to any other hubless caster design provided with at least one such drainage port.

Figure 14:
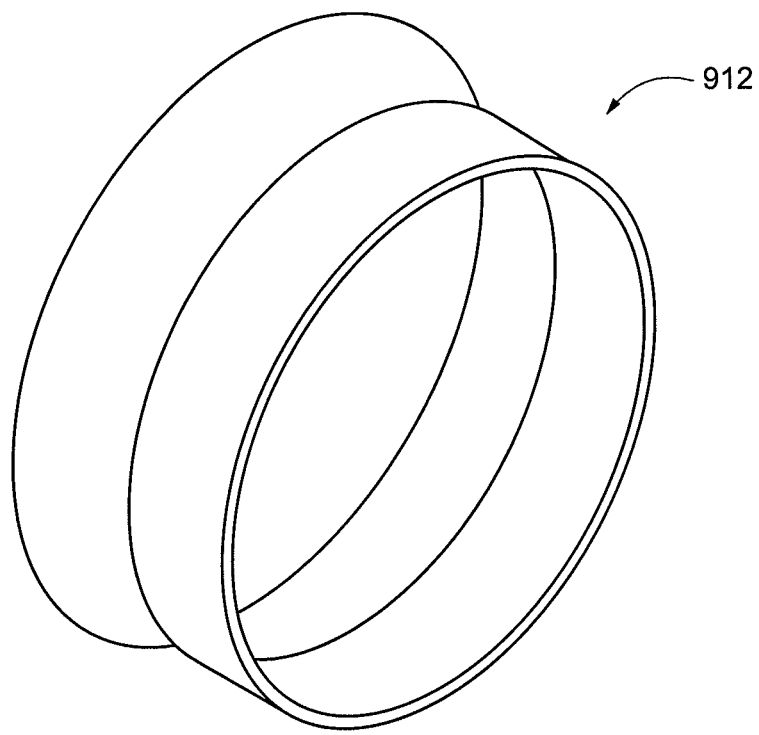
FIG. 14 is a perspective view of a liner ring according to an embodiment of the present invention.

Referring again to FIGS. 3, 9, and 10A-10D, in some embodiments, the hubless caster 300 includes a liner ring 912 for each mount portion 1006. The liner ring(s) 912 can be nested within a central opening 304 of the hubless caster 300. The end cap(s) 910 can optionally retain the liner ring(s) 912 on the hubless caster 300. In embodiments where the frame member 902 and the mount portion(s) 1006 are defined by a single body, the end cap(s) 910 can retain the liner ring(s) 912 against a generally cylindrical interior wall defined by the single body. An illustrative liner ring 912 is shown in FIG. 14. Liner rings 912 can enhance the appearance of the hubless caster 300. In some embodiments, the liner rings 912 are made of aluminum, plastic, wood, or another decorative material. When provided, the liner rings can have virtually any desired color, luster, and/or other decorative properties. The liner rings (or "insert rings") can be made, for example, by stamping, machining, or molding.

The various components of the hubless caster 300 cooperate to allow a chair or any other article supported by the hubless caster 300 to roll. As noted above, the hubless roller assemblies 914 include an annular backbone member 904, a rolling element 906, and an outer wheel 908, with the rolling element 906 being positioned radially outwardly of the backbone member 904 and the wheel 908 being positioned radially outwardly of the rolling element 906. The rollers 920 of the rolling element 906 rotate freely within the roller receptacles 918. As the outer wheel 908 rolls on a surface (e.g., the floor), the wheel exerts a tangential force on the rollers, causing the rollers 920 to roll along the outer surface 1104 of the backbone member 904. The backbone member 904 defines an inner bearing race (or "inner raceway"). Thus, the illustrated rollers 920 are adapted to roll against the annular backbone member 904, rather than the rolling against a mount portion 1006 of the caster frame. This configuration is advantageous in that it can provide a highly durable caster, it can prevent the mount portion 1006 from wearing prematurely, or both. In the illustrated embodiments, the wheel 908 defines an outer bearing race (or "outer raceway"). Thus, the rollers 920 are adapted to roll between the inner bearing race and the outer bearing race. In certain embodiments, both bearing races are defined by metal surfaces. In other embodiments, the inner race (which is a primary wear component) is defined by a metal surface, while the outer race is defined by a polymer surface. The wheel 908, for example, can alternatively be a single ring comprising a polymer.

In some embodiments, the backbone member 904, the rolling element 906, and the wheel 908 have a force-distributing assembly configuration. The force-distributing assembly configuration can be characterized by the backbone member 904, the rolling element 906, and the wheel 908 all having substantially the same width. In this way, force transferred between the wheel 908 and the backbone member 904 is distributed over substantially the entire width of the rolling element 906. This broad distribution of force can reduce the likelihood of the hubless caster 300 wearing unevenly, increase the load rating of the caster, and/or improve the overall performance of the caster. In some embodiments of this nature, the rolling element 906 comprises a plurality of cylindrical rollers 920 each having a cylinder length (extending parallel to the wheel's axis of rotation) that is substantially the same as the widths of the backbone member and the wheel.

One way to characterize the configuration of a hubless caster 300 is by its profile ratio. FIG. 5 shows a hubless roller assembly 914 of the hubless caster 300. The roller assembly 914 has an outer wheel radius OWR and a radial thickness RT. Here, the outer wheel radius OWR corresponds to the radius of the outer surface (or "tread surface") of the exterior ring (1304 in FIG. 13). This outer surface is the surface that would contact the floor or ground. In many embodiments, the radial thickness RT corresponds to the difference between the outer wheel radius OWR and the minimum interior radius of the frame member or any liner ring. The ratio of radial thickness RT to outer wheel radius OWR is referred to as the profile ratio of the hubless caster 300. Generally speaking, a hubless caster 300 with a low profile ratio is considered a low profile hubless caster 300.

Due to the improved design of the present hubless caster, it can provide a surprising degree of durability even though it has a very low profile. In some embodiments, the radial thickness RT of the hubless roller assembly 914 is less than half as great as the outer wheel radius OWR, such that the hubless caster 300 has a profile ratio of less than 0.5. In certain embodiments, the profile ratio of the hubless caster 300 is even lower, such as less than 0.45, less than 0.4, less than 0.35, less than 0.3, less than 0.25, or less than 0.2. In some embodiments, even though the hubless caster has a profile ratio within any one or more of these ranges, the dynamic load rating of the hubless caster 300 is at least 90 pounds. In some embodiments, the dynamic load rating is even greater, such as at least 93 pounds, at least 100 pounds, at least 150 pounds, at least 200 pounds, at least 300 pounds, at least 400 pounds, at least 500 pounds, or at least 600 pounds. In some embodiments, the hubless caster has a profile ratio of less than 0.5, or even less than 0.4, and yet the hubless caster has a dynamic load rating of at least 150 pounds. In some heavier duty embodiments, the hubless caster has a profile ratio of less than 0.5, or even less than 0.4, and yet the hubless caster has a dynamic load rating of at least 200 pounds. In some particularly heavy duty embodiments, the hubless caster has a profile ratio of less than 0.5, or even less than 0.4, and yet the hubless caster has a dynamic load rating of at least 400 pounds, or even at least 500 pounds.

The dynamic load ratings reported herein are in accordance with the North American Performance Standards for Casters and Wheels (ICWM 2004), Section 7.8.1, the contents of which are incorporated herein by reference. Briefly, the test establishes the operational load capacity for casters at or under 2.5 mph by determining the maximum load that can be carried during operation with no functional impairment to the caster. Upon completion of the test, the acceptance criteria are that the swivel and wheel bearing shall rotate freely and the parts shall be free from defects which can impair caster function.

Different embodiments of the present caster meet various other performance criteria. Some embodiments produce a minimal amount of noise during operation. In some embodiments of this nature, the caster is devoid of plastic parts in dynamic contact with (e.g., rubbing against, or configured to rub against during rolling of the caster) other plastic parts. In certain embodiments of this nature, each mount portion comprises (or consists essentially of) a polymer, the backbone member comprises (or consists essentially of) a metal, the rollers of the rolling element comprise (or consist essentially of) a polymer, and the wheel has a metal surface defining the outer bearing race. Some embodiments provide self-braking (and/or a resistance to being moved inadvertently), such that a chair equipped with the present hubless casters requires a significant force, such as at least 12 Newtons, to move the chair from a stationary position. The design of the present caster is advantageous in that it can exhibit particularly good self-braking performance without requiring a separate braking mechanism. In such embodiments, the hubless roller assembly 914 can be provided with a lubricant having a viscosity sufficient to achieve the desired self-braking functionality.

Figure 17:
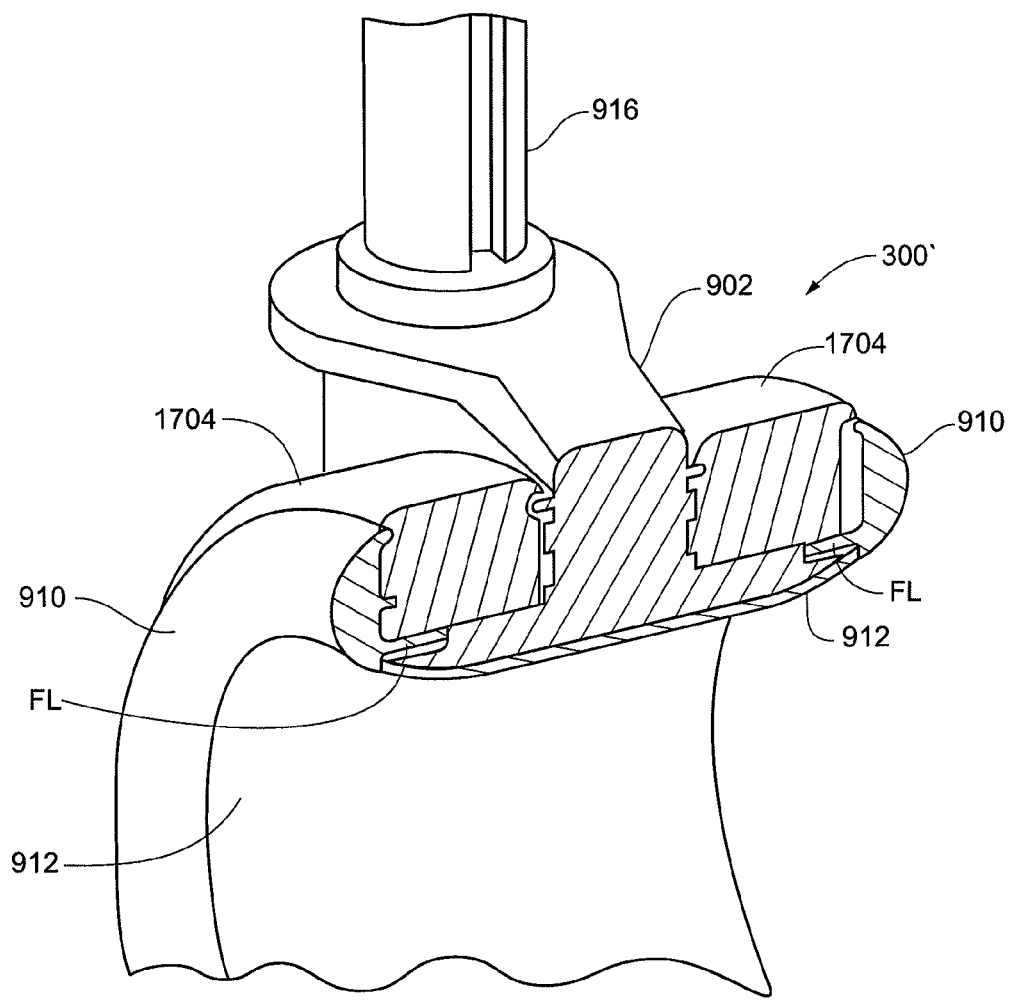
FIG. 17 is a cutaway view of a hubless caster according to embodiments of the present invention wherein a low friction ring is used as a wheel and the caster is devoid of any ball bearings or roller bearings.

FIG. 17 shows an embodiment wherein the hubless caster 1700 is devoid of ball bearings and roller bearings. Instead of providing such conventional bearings, the present design has a low friction ring defining a wheel that simply slides in a channel of the caster. Here, the caster 1700 has a two-wheel configuration, including two wheels 1702, 1704 and two corresponding mount portions 1706, 1708. However, a single-wheel design can also be used. The interface of the outer wheels 1702, 1704 and the corresponding mount portions 1706, 1708 is formed by materials having low coefficients of friction, thereby allowing the wheels 1702, 1704 to rotate freely relative to the mount portions 1706, 1708.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A hubless caster comprising a frame member having two opposed sides from at least one of which projects a generally ring-shaped mount portion, the hubless caster having the following three components mounted on the mount portion, in sequence moving radially outwardly from the mount portion: a) an annular backbone member defining an inner bearing race, b) a rolling element, and c) a wheel defining an outer bearing race, such that the hubless caster is configured so that the rolling element rolls against the annular backbone member and not against the mount portion, whereby the annular backbone member protects the mount portion.

2. The hubless caster of claim 1, wherein the annular backbone member, the rolling element, and the wheel have a force-distributing assembly configuration characterized by the backbone member, the rolling element, and the wheel all having substantially the same width, such that force transferred between the wheel and the annular backbone member is distributed over substantially an entire width of the rolling element.

3. The hubless caster of claim 1, wherein the annular backbone member is carried against, but is not joined to, the mount portion.

4. The hubless caster of claim 3, wherein the annular backbone member comprises a metal, and the mount portion of the frame member comprises a polymer.

5. The hubless caster of claim 1, wherein the annular backbone member comprises a steel ring.

6. The hubless caster of claim 1, wherein the caster has two generally ring-shaped mount portions projecting respectively from the two opposed sides of the frame member, wherein on each mount portion the following three components are mounted, in sequence moving radially outwardly from the mount portion: a) the annular backbone member defining the inner bearing race, b) the rolling element, and c) the wheel defining the outer bearing race.

7. The hubless caster of claim 1, wherein the rolling element includes a retainer and a plurality of rollers, the retainer having receptacles in which the rollers are received, such that the rollers roll against the annular backbone member and not against the mount portion.

8. The hubless caster of claim 7, wherein said rollers each have a cylindrical shape.

9. A durable low profile hubless caster, the caster having a hubless roller assembly with an outer wheel radius and a radial thickness, the radial thickness of the hubless roller assembly being less than half as great as the outer wheel radius such that the hubless caster has a profile ratio of less than 0.5 and yet the hubless caster has a dynamic load rating of at least 150 pounds, the hubless caster comprising a frame member having two opposed sides from at least one of which projects a generally ring-shaped mount portion, the hubless caster having the following three components mounted on the mount portion, in sequence moving radially outwardly from the mount portion: a) an annular backbone member defining an inner bearing race, b) a rolling element, and c) a wheel, such that the hubless caster is configured so that the rolling element rolls against the annular backbone member and not against the mount portion, whereby the annular backbone member protects the mount portion.

10. The hubless caster of claim 9, wherein the profile ratio is less than 0.4.

11. The hubless caster of claim 9, wherein the load rating is at least 200 pounds.

12. The hubless caster of claim 11, wherein the load rating is at least 400 pounds.

13. The hubless caster of claim 9, wherein the annular backbone member, the rolling element, and the wheel have a force-distributing assembly configuration characterized by the backbone member, the rolling element, and the wheel all having substantially the same width, such that force transferred between the wheel and the annular backbone member is distributed over substantially an entire width of the rolling element.

14. The hubless caster of claim 9, wherein the annular backbone member comprises a steel ring.

15. A hubless caster comprising a frame member having two opposed sides from at least one of which projects a generally ring-shaped mount portion, the hubless caster having the following three components mounted on the mount portion, in sequence moving radially outwardly from the mount portion: a) an annular backbone member defining an inner bearing race, b) a rolling element, and c) a wheel defining an outer bearing race, the hubless caster being provided with a roller-retention end cap, the end cap being joined to the mount portion so as to retain the annular backbone member, rolling element, and wheel on the frame member.

16. The hubless caster of claim 15, wherein the end cap remains in a non-rotating configuration even when the wheel of the hubless caster is rotating.

17. The hubless caster of claim 15, wherein the frame member and the end cap both comprise a polymer, and an ultrasonic weld joins the end cap to the mount portion.

18. The hubless caster of claim 15, wherein a liner ring is nested within a central opening of the hubless caster, and the end cap retains the liner ring on the hubless caster.

19. The hubless caster of claim 18, wherein the frame member and the mount portion are both defined by a single body, and the end cap retains the liner ring against a generally cylindrical interior wall defined by said body.

20. The hubless caster of claim 15, wherein the frame member is a central frame member, and two generally ring-shaped mount portions project respectively from the two opposed sides of the central frame member, wherein on each mount portion the following three components are mounted, in sequence moving radially outwardly from the mount portion: a) the annular backbone member defining the inner bearing race, b) the rolling element, and c) the wheel defining the outer bearing race; the hubless caster being provided with two roller-retention end caps each joined to one of the mount portions so as to retain each annular backbone member, rolling element, and wheel on the central frame member.

21. A hubless caster comprising a frame member having two opposed sides from at least one of which projects a generally ring-shaped mount portion, the mount portion comprising a polymer, the hubless caster having the following three components mounted on the mount portion, in sequence moving radially outwardly from the mount portion: a) an annular backbone member defining an inner bearing race, b) a rolling element, and c) a wheel, such that the hubless caster is configured so that the rolling element rolls against the annular backbone member and not against the mount portion, whereby the annular backbone member protects the mount portion.

22. The hubless caster of claim 21, wherein the rolling element comprises a plurality of rollers, such that the rollers roll against the annular backbone member and not against the mount portion.

23. The hubless caster of claim 22, wherein said rollers each have a cylindrical shape.

24. A hubless caster comprising a frame member having two opposed sides from at least one of which projects a generally ring-shaped mount portion, the mount portion comprising a polymer, the hubless caster having the following three components mounted on the mount portion, in sequence moving radially outwardly from the mount portion: a) an annular backbone member defining an inner bearing race, b) a rolling element, and c) a wheel, the hubless caster being provided with a roller-retention end cap, the end cap being joined to the mount portion so as to retain the annular backbone member, rolling element, and wheel on the frame member, wherein the end cap remains in a non-rotating configuration even when the wheel of the hubless caster is rotating.

25. The hubless caster of claim 24, wherein the rolling element comprises a plurality of rollers, such that the rollers roll against the annular backbone member and not against the mount portion.

26. The hubless caster of claim 24, wherein the annular backbone member comprises a steel ring.

* * * * *